US 11,030,570 B2

(12) United States Patent
Raut et al.

(10) Patent No.: US 11,030,570 B2
(45) Date of Patent: Jun. 8, 2021

(54) SYSTEM AND METHOD FOR DYNAMIC FLEET MANAGEMENT

(71) Applicant: Tata Consultancy Services Limited, Mumbai (IN)

(72) Inventors: Sumit Raut, Kolkata (IN); Mohit Pandey, Mumbai (IN); Pushpkumar Jain, Pune (IN); Devang Patel, Mumbai (IN); Ankur Chakraborty, Kolkata (IN); Prosenjit Mondal, Kolkata (IN); Abhishek Rajpoot, Mumbai (IN)

(73) Assignee: TATA COLSULTANCY SERVICES LIMITED, Mumbai (IN)

( * ) Notice: Subject to any disclaimer, the term of this patent is extended or adjusted under 35 U.S.C. 154(b) by 304 days.

(21) Appl. No.: 15/987,301

(22) Filed: May 23, 2018

(65) Prior Publication Data

US 2018/0341918 A1    Nov. 29, 2018

(30) Foreign Application Priority Data

May 24, 2017    (IN) .............................. 201721018293

(51) Int. Cl.
*G06Q 10/08* (2012.01)
*G06Q 10/06* (2012.01)
(Continued)

(52) U.S. Cl.
CPC . *G06Q 10/08355* (2013.01); *G06Q 10/06315* (2013.01); *G07C 5/0808* (2013.01);
(Continued)

(58) Field of Classification Search
CPC .......... G07C 5/008; G08G 1/20; G06Q 50/30; G06Q 10/04; G06Q 10/06; G06Q 10/08355
(Continued)

(56) References Cited

U.S. PATENT DOCUMENTS

| 5,880,958 | A  | * | 3/1999  | Helms    | G08G 1/202 |
|           |    |   |         |          | 340/991    |
| 7,457,766 | B1 | * | 11/2008 | Noble    | G06Q 10/087 |
|           |    |   |         |          | 705/7.31   |
| 8,738,289 | B2 | * | 5/2014  | Ghoting  | G01C 21/3453 |
|           |    |   |         |          | 701/411    |
| 2001/0010028 | A1 | * | 7/2001 | Thibault | G07C 5/04  |
|           |    |   |         |          | 701/29.6   |
| 2005/0222933 | A1 | * | 10/2005 | Wesby   | H04L 67/10 |
|           |    |   |         |          | 705/36 R   |

(Continued)

FOREIGN PATENT DOCUMENTS

EP    2 827 289 A1    1/2015

OTHER PUBLICATIONS

Rodolfo Dondo et al.,"The multi-echelon vehicle routing problem with cross docking in supply chain management" Computers and Chemical Engineering, vol. 35, Issue 12 pp. 3002-3024; Volume-issue number(s): Dec. 14, 2011 Publisher: Elsevier Ltd: https://pdfs.semanticscholar.org/4ca5/2d9ed0e77237981f3d9e92c282692c30c76e.pdf.

*Primary Examiner* — Johnna R Loftis
(74) *Attorney, Agent, or Firm* — Finnegan, Henderson, Farabow, Garrett & Dunner LLP

(57) ABSTRACT

This disclosure relates generally to doorstep delivery of services and products, and more particularly to a system and a method for dynamic fleet management for order delivery are provided. Initially, a primary route is assigned to a vehicle from a fleet of vehicles, based on at least one of a known order and a forecasted order. Further, when the vehicle is in transit along the primary route, in response to an input with respect to at least one of a route alteration parameter, one of an alternate route or a corrective action, is determined, and one or more corresponding actions are triggered, which helps with the order delivery.

6 Claims, 8 Drawing Sheets

(51) Int. Cl.
    *G07C 5/08*  (2006.01)
    *G08G 9/00*  (2006.01)
    *G08G 1/00*  (2006.01)
    *G16Y 10/40* (2020.01)

(52) U.S. Cl.
    CPC ............... *G08G 1/202* (2013.01); *G08G 9/00* (2013.01); *G16Y 10/40* (2020.01)

(58) Field of Classification Search
    USPC ................................................. 705/7.12, 330
    See application file for complete search history.

(56) References Cited

U.S. PATENT DOCUMENTS

| | | | |
|---|---|---|---|
| 2008/0275643 A1 | 11/2008 | Yaqub et al. | |
| 2011/0022298 A1* | 1/2011 | Kronberg | G01C 21/3484 |
| | | | 701/532 |
| 2011/0060496 A1* | 3/2011 | Nielsen | G06Q 10/0631 |
| | | | 701/31.4 |
| 2014/0046585 A1* | 2/2014 | Morris, IV | G01C 21/3415 |
| | | | 701/468 |
| 2015/0370251 A1 | 12/2015 | Siegel et al. | |
| 2016/0328669 A1* | 11/2016 | Droege | G06Q 10/06311 |
| 2019/0066041 A1* | 2/2019 | Hance | G06Q 10/0833 |
| 2019/0188629 A1* | 6/2019 | Fujisawa | G06Q 30/0635 |

* cited by examiner

Intersections

SYSTEM AND METHOD FOR DYNAMIC FLEET MANAGEMENT

PRIORITY CLAIM

This U.S. patent application claims priority under 35 U.S.C. § 119 to: India Provisional Application No. 201721018293, filed on May 24, 2017. The entire contents of the aforementioned application are incorporated herein by reference.

TECHNICAL FIELD

This disclosure relates generally to doorstep delivery of services and products, and more particularly to a system and a method for dynamic fleet management.

BACKGROUND

Logistics cost is one of the largest (or second largest) expenditure components in most of the industry. Efficient fleet management (including routing of vehicles) helps improve margins. In case of Consumer Packaged Goods (CPG) companies, orders are received from retail stores which are their customers and these orders are delivered from distribution centers to retail stores. In another scenario, door delivery services have become very popular, and these services allow people to place order for a product and/or a service from home/specific location where they may or may not be present, and service providers deliver the requested product and/or service at doorstep. There are many other scenarios where delivery of goods/services is to be made. Usually, a fleet of vehicles is deployed for providing such services to users. In such a scenario, fleet management is an important part of the overall service. For example, making sure that a vehicle that is expected to provide a service in a particular locality arrives the destination at the right time can be a part of the fleet management process. So according to services to be delivered, corresponding location and time if any, routing of one or more selected vehicles needs to be done.

The inventors here have recognized several technical problems with such conventional systems, as explained below. As part of order delivery and order management, the systems have to handle known orders as well as dynamically placed orders. In addition to this, there are multiple other parameters that would affect vehicle selection and routing as part of the fleet management. The conventional systems fail to consider various parameters that would affect the dynamic fleet management for order delivery, which in turn affects the overall service.

SUMMARY

Embodiments of the present disclosure present technological improvements as solutions to one or more of the above-mentioned technical problems recognized by the inventors in conventional systems. For example, in one embodiment, a processor-implemented method for fleet management for order delivery is provided. The fleet management for order delivery includes assigning a primary route to a vehicle from a fleet of vehicles, via one or more hardware processors, based on at least one of a known order and a forecasted order; receiving an input with respect to at least one of a route alteration parameter when the vehicle is in transit in the primary route, via the one or more hardware processors; determining one of an alternate route or a corrective action, in response to the at least one route alteration parameter, via the one or more hardware processors; and performing one of: generating at least one instruction to re-route the vehicle along the determined alternate route, if in response to the at least one route alteration parameter the alternate route is determined, via the one or more hardware processors; or triggering the corrective action, if in response to the at least one route alteration parameter the corrective action is determined, via the one or more hardware processors.

In another embodiment, a system (100) for fleet management for order delivery is provided. The system 100 includes a processing module (104) comprising one or more hardware processors; and a memory module (102) operatively coupled to the one or more hardware processors and configured to store instructions configured for execution by the one or more hardware processors to: assign a primary route to a vehicle from a fleet of vehicles, by a dynamic route planning system (103) of the system (100), based on at least one of a known order and a forecasted order assigned to the vehicle by an order distribution system (101); receive an input with respect to at least one of a route alteration parameter when the vehicle is in transit in the primary route, by the dynamic route planning system (103); determine one of an alternate route or a corrective action, in response to the at least one route alteration parameter, by the dynamic route planning system (103); and perform one of: generating at least one instruction to re-route the vehicle along the determined alternate route, if in response to the at least one route alteration parameter the alternate route is determined, by the dynamic route planning system (103); or triggering the corrective action, if in response to the at least one route alteration parameter the corrective action is determined, by the dynamic route planning system (103).

In yet another embodiment, a non-transitory computer readable medium for fleet management for order delivery is provided. The non-transitory computer readable medium performs the fleet management by assigning a primary route to a vehicle from a fleet of vehicles, via one or more hardware processors, based on at least one of a known order and a forecasted order; receiving an input with respect to at least one of a route alteration parameter when the vehicle is in transit in the primary route, via the one or more hardware processors; determining one of an alternate route or a corrective action, in response to the at least one route alteration parameter, via the one or more hardware processors; generating at least one instruction to re-route the vehicle along the determined alternate route, if in response to the at least one route alteration parameter the alternate route is determined, via the one or more hardware processors; and triggering the corrective action, if in response to the at least one route alteration parameter the corrective action is determined, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
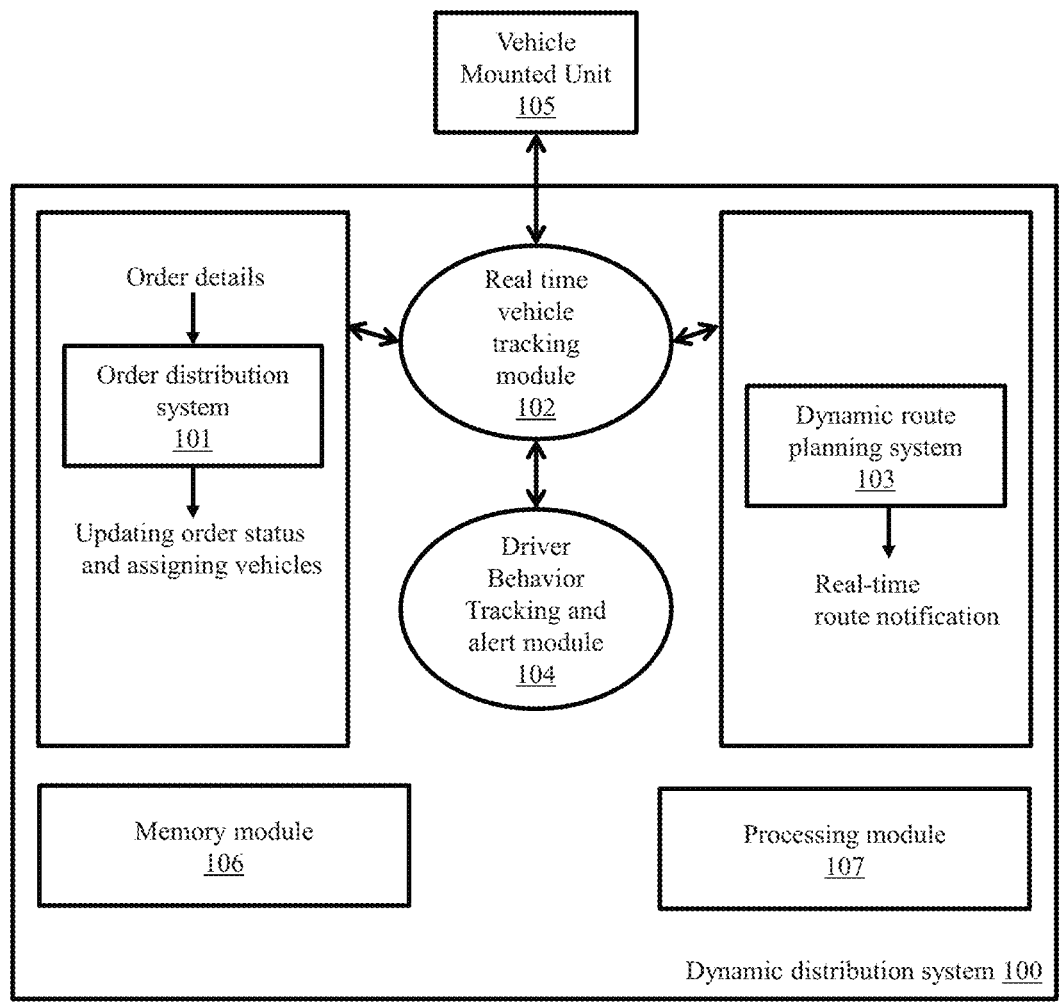
FIG. 1 illustrates a block diagram of dynamic distribution system for dynamic route planning, according to some embodiments of the present disclosure.

FIG. 1 illustrates a block diagram of a dynamic distribution system 100 for dynamic route planning, according to some embodiments of the present disclosure. The dynamic distribution system 100 includes an order distribution system 101, a real time vehicle tracking module 102, a dynamic route planning system 103, a driver behavior tracking and alert module 104, a Vehicle Mounted Unit (VMU) 105, a memory module 106, and a processing module 106. In an embodiment, the aforementioned components of the dynamic distribution system 100 as well as number of each of the components can vary according to implementation standards/requirements.

The dynamic distribution system 100 can be used for managing route planning in road, water, or air mode of transportation. Further, the vehicle can be manned or unmanned vehicle. Example of unmanned vehicle is a drone which is an Unmanned Aerial Vehicle (UAV).

The order distribution system 101 is configured to handle at least three major functions: 1. Collecting information pertaining to orders, 2. Updating order status based on the collected information on order status, and 3. Assigning order to selected vehicles. In an embodiment, the order distribution system 101 collects information such as but not limited to placement of order, cancellation of order, and returned orders, as inputs from one or more sources. The source in this particular context can be a retail store, a user, and the like. The order distribution system 101, by processing the collected information pertaining to the orders, determines how order status being maintained in an associated database is to be updated, and accordingly updates the order status. For example, assume that an order gets cancelled, then the order status is updated to reflect the cancellation of order. Similarly when a new order is placed, the order status is updated to reflect the same. The order distribution system 101 is further configured to assign orders to selected vehicles that are part of a fleet being used to deliver services to the orders. The term 'service' herein can refer to a product and/or a process, and pellets of products can be delivered in response to an order. In an embodiment, the order distribution system 101 identifies appropriate vehicle(s) an order is to be assigned to, based on information such as but not limited to vehicles that are part of the fleet, zone each vehicle in the fleet is currently in, current location of the vehicle(s) in the zone from where the order has been placed, and proximity of the vehicle(s) in that particular zone to the destination (where service in response to the order is to be delivered), and such information collected as part of real-time vehicle tracking. Based at least on the aforementioned factors, the order distribution system 101 assigns orders to vehicles, for known orders as well as for real-time orders. The order distribution system 101 is further configured to perform store clustering and forecasting of upcoming demand, so as to predict demand at a zone level, which in turn allows the dynamic distribution system 100 to effectively manage orders. For example, consider that stores in a particular zone sell fire crackers. At the time of festivals like Diwali, the order distribution system 100 gets more number of orders for fire crackers. The demand and in turn order forecasting helps the dynamic distribution system 100 to anticipate an increase/decrease in demand in each zone, which in turn allows to plan number of vehicles to be deployed to each zone (lesser if decrease in demand is predicted, and more if increase in demand is predicted), and also plan number of pallets to be loaded in each vehicle (more number of pallets in vehicles travelling to a zone where high demand is predicted, lesser number of pallets in vehicles travelling to a zone where low demand is predicted). In the aforementioned example, by anticipating higher demand for products (fire crackers in this example) at a particular time period, the order distribution system 100 can allocate/assign more vehicles to the zone(s) where the shops that sell fire crackers are located, and can also increase the number of pellets as more customers would place orders for fire crackers. The demand (and in turn order) forecasting mechanism executed by the order distribution system 101 is explained below:

The order distribution system 101 collects details pertaining to all stores across a geographical location to be served, and then partitions (grouping) all the stores into multiple sub classes called zones such that servicing of dynamic orders is optimized in terms of cost and time of servicing delivery. Parameters used for partitioning are but not limited to volume of mobile order received, number and type of vehicles servicing that group, distance between stores, location of stores, and traffic conditions. The order distribution system 101 then considers possible combinations of grouping and a score is calculated for each combination. The combination with minimum score is then selected for grouping stores in zones. Score is defined as cost of servicing a new mobile order based on parameters such as but not limited to extra unplanned vehicles needed, extra time impact on defined orders delivery and impact on life of any items services by stores. The score is calculated as the cost using the following equation:

$$S_z = \sum_{i \in D} \sum_{j \in D} C_{ij}^v + |V| + t_{ij}^v \quad (1)$$

where $C_{ij}^v$—represents cost of travelling for vehicle v between store i, j. Where i, j belongs to zone in consideration.

$|V|$—represents number of vehicles deployed $t_{ij}^v$—represents time to travel from store i to j for the vehicle v, where i,j belongs to zone in consideration.

$S_z$—score for the zone z.

Now in order to forecast the demand at zone level, the order distribution system 101 collects history data pertaining to volume of mobile product orders from each store at zone level. The order distribution system 101 then considers certain parameters out of the collected history data as impact parameters, and assigns weightage to each of the impact parameters. A few examples of the impact parameters is given below:

Variability of order volume by day of week, and week of month.

Time of year and factors such as festivals, events

Impact of seasons on the product consumption

Based on the weightages assigned, the order distribution system 101 then forecasts demand and order for an item, at a particular zone, at a particular time period, using the following equation:

$$Y_{dpz} = \alpha_{dpz} + \beta_{dpz,1} Y_{dpz,d-1} + \beta_{dpz,2} D_{dpz} + \beta_{dpz,3} W_{dpz} \quad (2)$$

Where,

α, β are constants $Y_{dpz}$ refers demand of product on day d for product p and zone z $D_{dpz}$ refers whether the day is weekend or weekday $W_{dpz}$ refers week of the month that the day d belongs The real time vehicle tracking system 102 is configured to receive real time vehicle location information of each vehicle being tracked, in a suitable format (for example, Global Positioning System (GPS) coordinates), as well as one or more of other parameters such as but not limited to speed, and events related to sudden brakes, acceleration, sharp turns and so on, which represents driver behavior. The real time vehicle tracking system 102 is further configured to collect data pertaining to one or more external parameters such as but not limited to weather, and traffic details from appropriate sources that are internal and/or external to the dynamic distribution system 100. This helps in knowing exact location of every vehicle as well as other external conditions which are input to a Dynamic Route planning system 103 as well as the Order Distribution system 101. In an embodiment, the real time vehicle tracking system 102 is a cloud based Internet of Things (IoT) based system that supports required functions of the dynamic distribution system 100.

Figure 7:
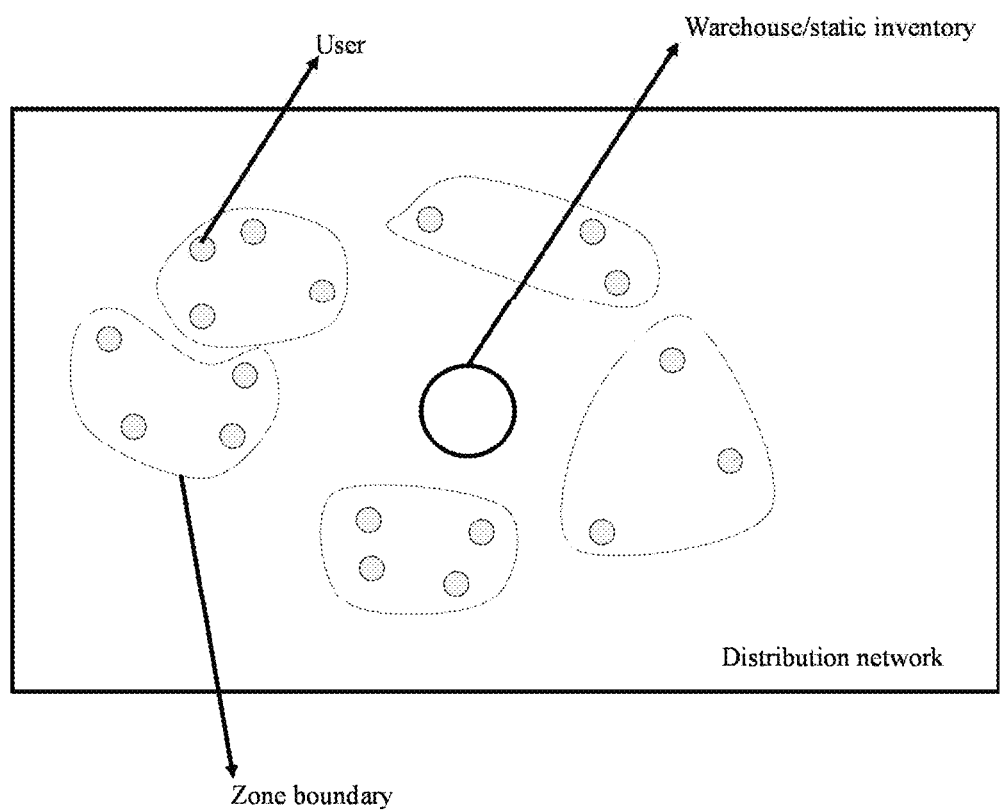
FIG. 7 illustrates an exemplary distribution network, according to some embodiments of the present disclosure.

The dynamic route planning system 103 is configured to plan routes, for each vehicle in a fleet of vehicles associated with the dynamic distribution system 100, to effectively serve the received orders. For example, consider the distribution network as in FIG. 7. This distribution network includes one warehouse/static inventory, and multiple users surrounding the warehouse. The users herein can be a retail store and/or an individual, from where orders are placed/returned/cancelled. The dynamic distribution system 100 has clustered the users as belonging to different zones, as depicted. Based on active orders (orders that are to be served) at any instance, and based on information pertaining to vehicles the active orders are assigned to, the dynamic route planning system 103 performs the route planning for each vehicle. In an embodiment, the active orders at the time of route planning can refer to known orders. The dynamic route planning system 103 is further configured to receive, after the route planning based on the known orders, receive information pertaining to real-time orders and corresponding target/destination assignments for one or more vehicles. The dynamic route planning system 103 is further configured to dynamically plan route for the vehicle, incorporating the newly added destination. In various embodiments, the dynamic planning of the route can involve modifying the already defined route or defining a new route from scratch based on the currently active orders (which, in this scenario, includes the previously known orders as well as the newly added (real-time) order) placed by a user.

The driver behavior tracking and alert module 104 is configured to receive information from the real time vehicle tracking system 102 and track uncommon behavior of driver, if any, based on the received data. The driver behavior tracking and alert module 104 is further configured to generate and send alerts to notify a fleet management personnel as well as the corresponding drivers, through appropriate vehicle mounted unit 105. In an embodiment, the driver behavior tracking and alert module 104 calculates a driver behavior score for each driver, based on the data collected in real-time, using the following approach:

Consider that real-time information pertaining to sudden break (E1), sharp turn (E2), over speeding (E3), and stopping of vehicle for long time (W4) are collected. The driver behavior tracking and alert module 104 then assigns corresponding weightage to each of the collected parameter, and then determines the driver behavior score as:

$$\Sigma(E1*W1 + E2*W2 + E3*W3 + E4*W4 + \ldots Ex*Wx) \quad (3)$$

This driver behavior score information is used towards order distribution to a vehicle which is to be driven by a specific driver. Driver with bad driving behavior (as indicated by the driver behavior score) may pose constraints on driving in certain roads or regions.

The vehicle mounted units 105 are equipped with devices as well as other supporting electronics to get real time location as well as real time speed and other driver behavior parameters from the vehicles. The vehicle mounted units 105 further displays routes, alerts, and any other data related to the drivers, using suitable interface(s).

The memory module 106 can be configured to store any data that is being handled (and processed) by the dynamic distribution system 100, as part of order management, dynamic route planning, and all other functionalities being handled by the dynamic distribution system 100. The memory module 106 may store data in a centralized format, and/or in a distributed format. The memory module 106 can use volatile and/or non-volatile storage spaces to store data permanently or temporarily, as required. The memory module 106 is further configured to store one or more instructions, which can be executed by the processing module 107 to perform one or more actions associated with functions being handled by the other components of the dynamic distribution system 100.

The processing module 107 comprises of a plurality of hardware processors, which while executing the one or more instructions stored in the memory module 106, handles data processing associated with one or more functionalities being handled by each of the other components of the dynamic distribution system 100. In one mode of implementation, the data processing with respect to the order management and dynamic vehicle routing is handled by a processing module 107 located at a centralized location (a central server). In another mode of implementation, the hardware processors are in a distributed fashion.

The process of route planning for known orders and based on the dynamically received orders (real-time orders) are separately explained below:

a) Route Planning Based on Known Orders:
For this route planning, assumptions made are:
Order details have been received by the order distribution system 101 at start of day.
Inventory details for ordered products need not to be checked. It's assumed that orders have been received by the order distribution system 101 after validating inventory.
Minimum order size is the pallet size. Pallet sizes vary based on product and this information will be provided by customer.

Further, input Parameters to the dynamic route planning system 103 for the route planning are:
Details or indices of products or pellets to be delivered along with perishable product handling needs of environment control like temperature/humidity (E) for the product (k)
Life of perishable products (L) considered for delivery as part of orders, Perishable products should be assigned to vehicles with right environment control (temperature, humidity controls)
Store locations (n); which refers to location of users
Distributor center location (o); which refers to location of the warehouse
Zone (z) where number of stores belong to a zone z.
Order volume (in term of products) of product k from one location n (distribution center or store) to another location (distribution center or store) m ($S_{nmk}$)
Capability (B) of vehicle to offer temperature and humidity control
Mobile/real-time order $M_{ozk}$ of product k at zone z
Earliest time point to deliver order $S_{nmk}$ to store n (ETd)
Latest time point to deliver order $S_{nmk}$ to store n accounting for Life (L) of perishable products such that Life remaining is more than 50% after delivery (LTd)
Travel time from location n to m where vehicle start at time t using vehicle v ($T_{nmtv}$)
Travel cost from location n to m where vehicle start at time t using vehicle v ($C_{nmtv}$)
Capacity of vehicle v (Qv).
Unloading time of product $S_{onk}$ at store n ($U_{onk}$)
Loading time of back-order product Bonk at store n ($L_{ock}$)
(apv1, apv2 . . . , apvk): patterns to store k type of products with environment control needs (E) in vehicle v optimally with Capability (B) (which maintains capacity limit), where apvk is number of product k for pattern p for vehicle v.
Start (PS) and End (PE) of Vehicle route planning.
Vehicle status and position
Tstore (i, j): set of all possible nodes where order transfers from one location (distribution center or store) to another location (distribution center or store)
Let d denote the number of orders need to be served. Each order is linked with location or store (n). This requirement is defined using directed graph G=(N, A), where D={1, 2 . . . , d}∪0 and 0 indicates warehouse location. The travel time between two nodes (i, j) using vehicle v started at time t is $t_{ijtv}=T_{ijtv}+U_{oik}$.

Further, variables used for the route planning are:

$$X_{ij}^v = \begin{cases} 1, & \text{if } vehicle\,v\ travel\,from\,node\,i\ to\,node\,j \\ & (\text{or } deliver\,order\,j\ after\,order\,i) \\ 0, & \text{otherwise} \end{cases} \quad (4)$$

$P_{ik}^v$ is mobile order of product k at store I using vehicle v $B_i^v$ is a start time of unloading of order I using vehicle v $Q_{ik}^v$ denotes volume of product k at node i $$Y_{rvi} = \begin{cases} 1, & \text{if pattern } r \text{ is selected by vehicle } v \text{ at node } i \\ 0, & \text{otherwise} \end{cases}$$

Objective Function:
The objective function of the aforementioned requirement is to minimize the travel time and transportation cost while servicing all request within specified time:

$$\text{Minimize} \sum_{v \in V} \sum_{i \in D} \sum_{j \in D} C_{ij}^v * X_{ij}^v \quad (5)$$

Constraints are:
1. Each request's start and end points should be allocated to at least one of the assets/vehicle $$\sum_{v \in V} \sum_{j \in D} X_{ij}^v = 1 \quad \forall\, i \in D \quad (6)$$

$$\sum_{j \in D} X_{ji}^v - \sum_{j \in D} X_{ij}^v = 0 \quad \forall\, i \in D,\, v \in V$$

2. Each vehicle starts from warehouse and ends at warehouse.

$$\sum_{j \in D} X_{0j}^v = 1 \quad \forall\, v \in V \quad (7)$$

$$\sum_{j \in D} X_{j0}^v = 1 \quad \forall\, v \in V$$

3. Same vehicle use to pick-up order from one store to dispatch another store.

$$\sum_{j \in D} X_{jk}^v - \sum_{j \in D} X_{lj}^v = 0 \quad \forall\,(k,l) \in Tstore,\, v \in V \quad (8)$$

4. Order should be delivered within a given specified time-period $$B_j^v \geq (B_i^v + t_{ij}^v)X_{ij}^v, \forall i \in D, j \in D, v \in V$$

$$ET_i \leq B_i^v \leq LT_i \forall i \in D, v \in V \quad (9)$$

5. Vehicle cannot load pallets more than its specified limit $$Q_{jk}^v \geq \left(Q_{nk}^v - P_{nk}^v - \sum_i S_{ijk} + \sum_i S_{jik}\right) X_{nj}^v, \quad (10)$$

$$\forall n \in D, j \in D, v \in V, k \in K$$

$$\sum_v \sum_{n \in z} P_{nk}^v = M_{zk}, \quad \forall z \in Z, k \in K \quad (11)$$

$$Q_{jk}^v \leq Y_{rj}^v * a_k, \quad \forall r \in R, j \in D, v \in V, k \in K \quad (12)$$

$$\sum_{i \in D} \sum_{j \in D} X_{ij}^v * S_{oik} \leq Y_{r0}^v * a_k, \quad \forall r \in R, j \in D, v \in V, k \in K \quad (13)$$

$$\sum_{r \in R} Y_{rj}^v <= 1, \quad \forall j \in D, v \in V \quad (14)$$

The parameters thus determined are then used to perform the dynamic route planning for the vehicles, based on an order distribution optimization function.

b) Route Planning Based on Real-Time (Dynamic) Orders and Dynamic Parameters:

Dynamic route planning is to be done based on real-time/dynamic orders and/or based on certain parameters that would affect the service delivery as per an already planned route. For example, parameters such as but not limited to travel time (because of route congestion uncertainty), vehicle condition, order status (order cancellation), service times (loading and unloading time in a store), route blockages due to social or sports events and climate condition can affect the service delivery as per an already planned route. In such circumstances, the dynamic route planning is performed by the dynamic route planning system 103 to update route, and accordingly re-route the vehicle. Here the term 'vehicle condition' can refer to health of a vehicle being deployed or to be deployed for order delivery purpose. Each vehicle is monitored using appropriate sensors of the vehicle mounted unit 105 and data pertaining to various vehicle specific parameters such as but not limited to velocity, engine temperature, vibrations, acceleration, and tyre pressure are collected. The collected data is then processed by the real time vehicle tracking module 102. While processing the collected data, the real time vehicle tracking module 102 quantifies health of the vehicle based on the collected data, and then compares it with a threshold of health (which is again defined in terms of benchmark values for all the parameters being collected). The quantified health of the vehicle being less than the threshold of health indicates a vehicle breakdown scenario. In that case, if the vehicle is already in transit, the dynamic distribution system 100 can take a corrective action by sending an alternate vehicle for order delivery, and the dynamic route planning system 103 can perform dynamic route planning for both the vehicles to intersect at a point and transfer pallets to the alternate vehicle. If the vehicle is not in transit, then that particular vehicle may not be considered while assigning orders for delivery as chances of breakdown is more.

In case of mobile order of a particular zone, the dynamic distribution system 100 needs to re-route vehicle for a zone such that it can serve mobile order efficiently. Hence, the dynamic routing can be performed in parallel for each zone to update route of each fleet.

Appropriate systems/methods can be used for collecting real-time information with respect to various parameters such as but not limited to traffic information for a given route, climate conditions and so on, as required for the route planning. For example purpose, consider that Swarm Intelligence is used to update route of each fleet. For the purpose of explaining the route planning process, Particle Swarm Optimization (PSO) algorithm, which is a population based technique inspired by models of social swarm and flock behavior, is considered. In this algorithm, a particle is defined by its position $\vec{x}_l$, the position of its personal best solution found so far $\vec{p}_l$, and its velocity $\vec{v}_l$. Furthermore, each particle knows the best position found so far by the global swarm $\vec{p}_g$. The algorithm proceeds iteratively, updating first all velocities and then all particle positions as follows:

$$\vec{v}_l(t+1) = \omega \times \vec{v}_l(t) + \phi_1 \times r_1 \times (\vec{p}_l - \vec{x}_l) + \phi_2 \times r_2 \times (\vec{p}_g - \vec{x}_l) \quad (15)$$

$$\vec{x}_l(t+1) = \vec{x}_l(t) + \vec{v}_l(t+1) \quad (14)$$

The role of the inertia weight $\omega$ is to regulate the moving velocity of the particles. The parameters $\phi_1$, $\phi_2$ control the relative attraction of the personal best and global best found solutions. Finally, $r_1$ and $r_2$ are random variables drawn with uniform probability from [0, 1]. We use one dimensional array to represent for particle or solution. Each cell of one dimensional array:

TABLE 1

| Particle representation | | | | | | | | |
|---|---|---|---|---|---|---|---|---|
| 2 | 1 | 4 | 3 | 5 | 6 | 7 | 9 | 8 |

In the example as in table given above, the position of cell guides vehicle to serve requests in a particular sequence. Here, considering 'n' number of vehicles, the algorithm uses vehicle one by one till the point there is no request to serve. Each vehicle traverse from leftmost unserved request to right most request till the sum of request's order volume exceeds vehicle capacity.

Figure 4:
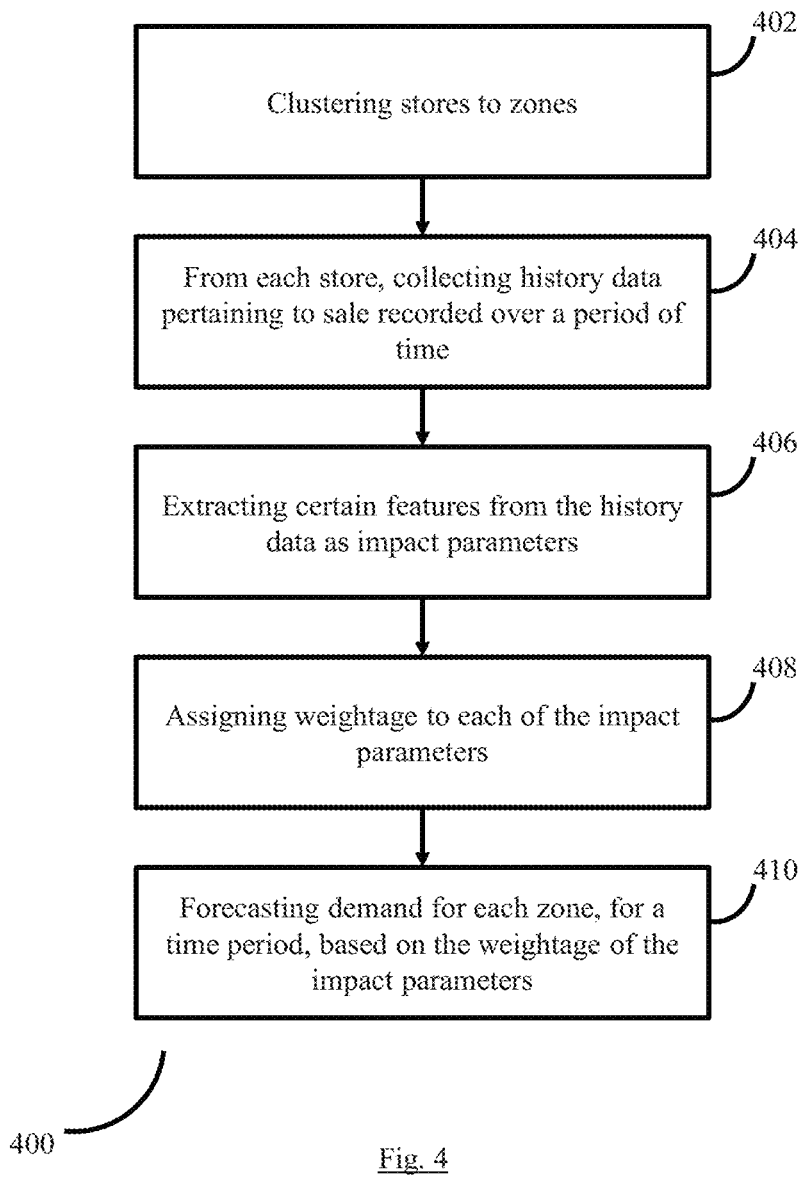
FIG. 4 is a flow diagram that depicts steps involved in the process of selecting one of an alternate route or a corrective action as part of the dynamic route planning, by the dynamic distribution system of FIG. 1, according to some embodiments of the present disclosure.
Figure 8A:
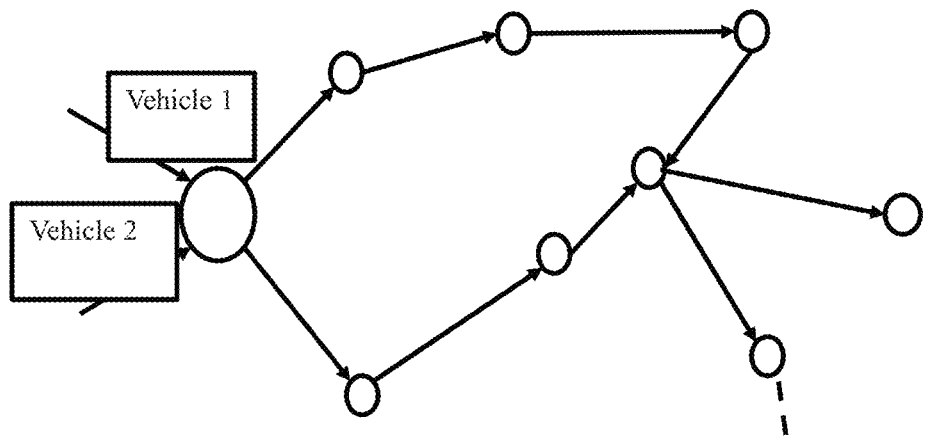
FIGS. 8A and 8B are example diagrams illustrating pallet swapping mechanism by the dynamic distribution system of FIG. 1, according to some embodiments of the present disclosure.
Figure 8B:
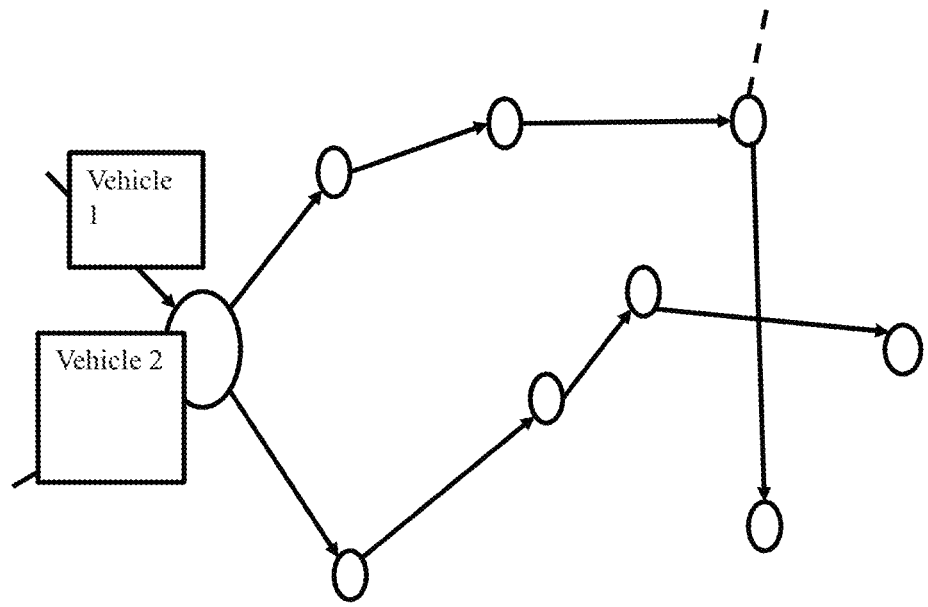

Pallet Swapping and Dynamic Routing:

Using an appropriate system such as Internet of Things (IoT), fleets are tracked in real-time and pallet swapping strategy is used if two fleets meet at intermediate swapping center point. Each fleet has a pre-scheduled route to serve different retail stores or customers after meeting point as shown in FIG. 4. FIG. 8A refers before pallet swapping stage and FIG. 8B refers after pallet transfers between vehicles. The dynamic route planning system 103 is configured to find the best possible pallet swapping to improve fleet utilization. The pallet swapping strategy at real-time is given below:

$Cap_{v1}$: Remaining capacity of vehicle v1 at meeting center $Cap_{v2}$: Remaining capacity of vehicle v2 at meeting center Step 1: Extract common stores set where v1 and v2 need to dispatch order and rank them ascending order.

Step 2: For a given common stores, find out the transportation time of vehicle 1 and vehicle 2 to dispatch order.

Step 3: Select the vehicle which has minimal transportation time to reach common store s and if vehicle 1 needs less time, check all pallets in vehicle 2 can be transferred to vehicle 1 while maintaining vehicle capacity constraint.

Step 4: If pallet can be transferred to vehicle 1, then vehicle 2 does not need to visit common store s and it will directly link to next store and formed an updated route for vehicle 2.

Step 5: Once the route updated, do the steps from Step 2 to Step 4 for next common store.

Figure 2:
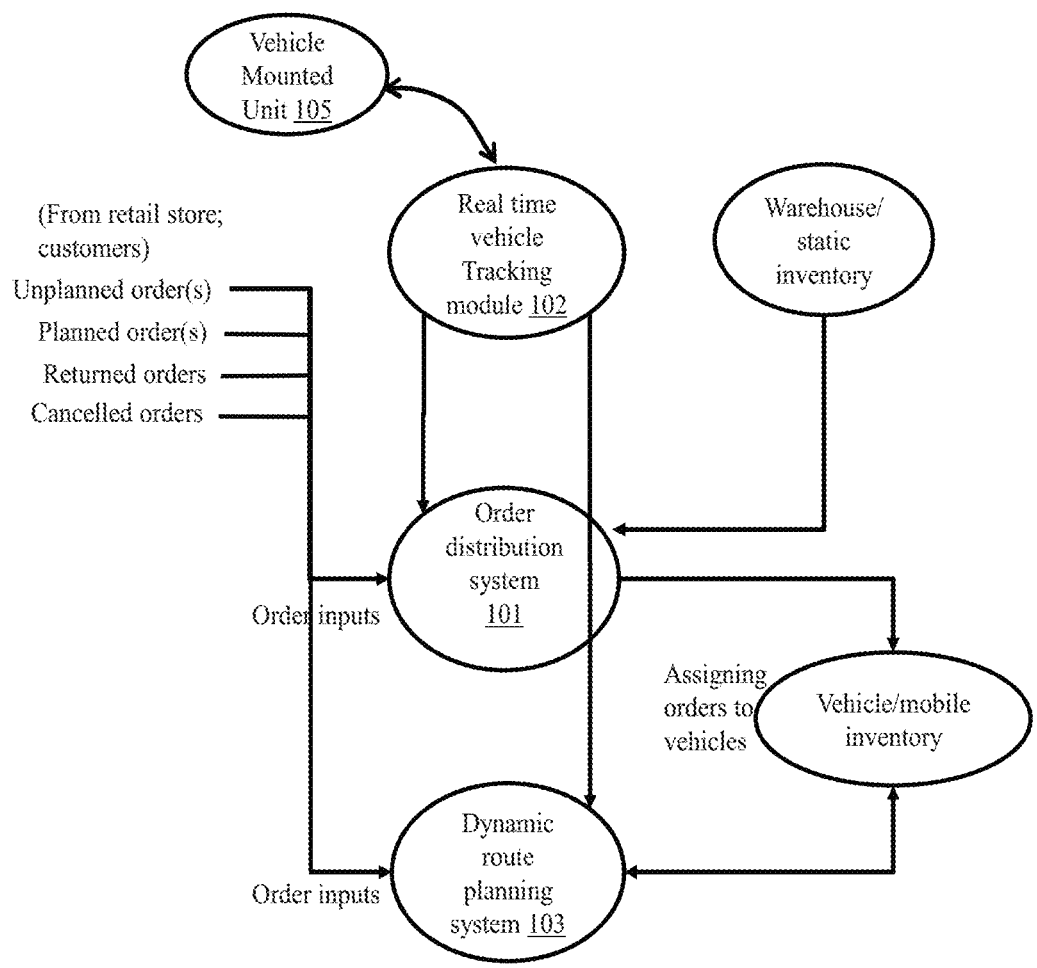
FIG. 2 is a flow diagram that depicts process flow in the dynamic route planning by the dynamic distribution system of FIG. 1, according to some embodiments of the present disclosure.

The data flow according to the process explained herein is depicted in FIG. 2.

Figure 3:
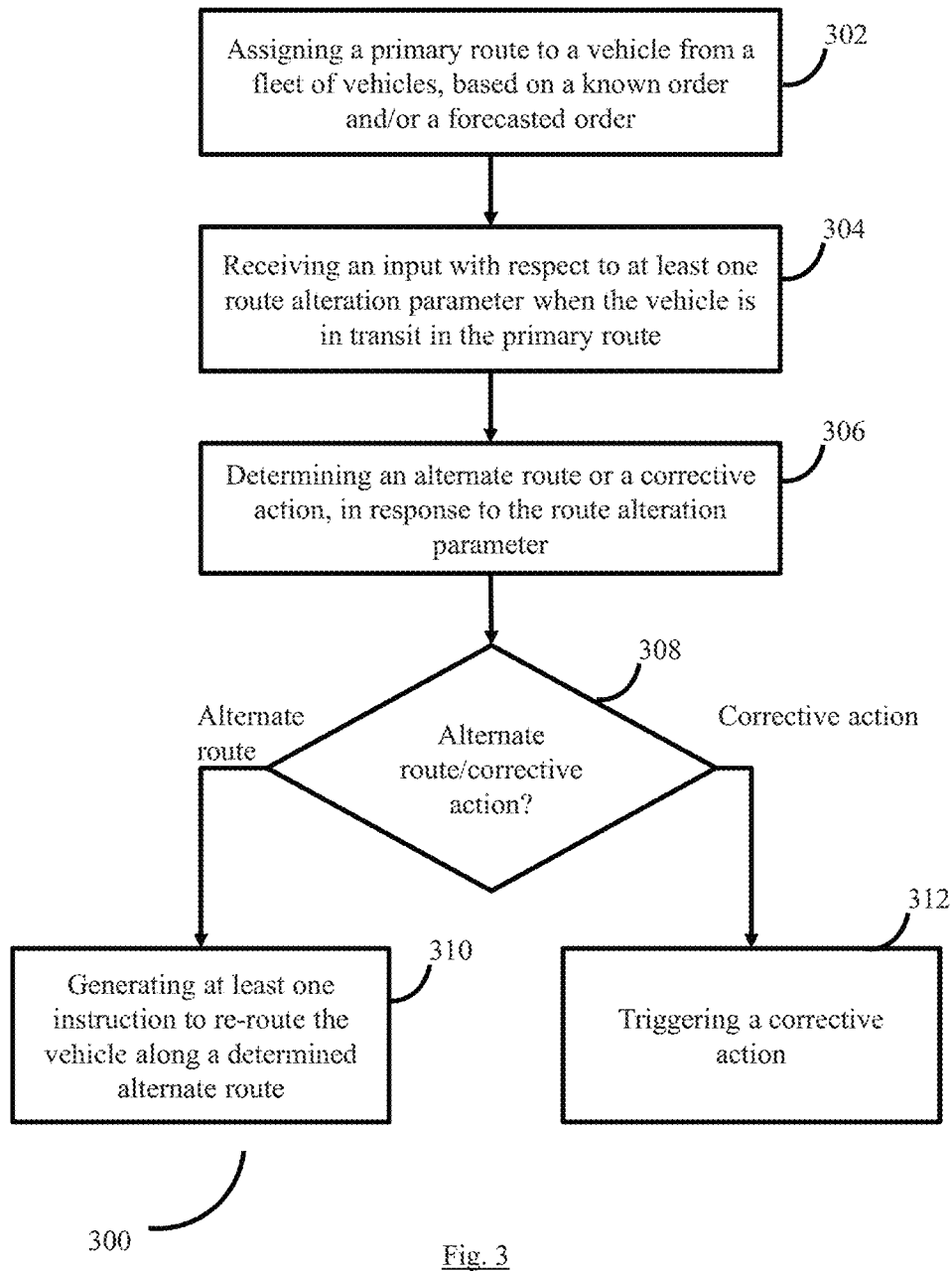
FIG. 3 is a flow diagram that depicts steps involved in the process of determining an alternate route or a corrective action as part of the dynamic route planning, by the dynamic distribution system of FIG. 1, according to some embodiments of the present disclosure.

FIG. 3 is a flow diagram that depicts steps involved in the process of determining an alternate route or a corrective action as part of the dynamic route planning, by the dynamic distribution system of FIG. 1, according to some embodiments of the present disclosure. Initially based on known orders, a primary route is assigned (302) to a vehicle in the fleet of vehicles. Here the term 'known order' can include orders that have been placed by customers and are known to the dynamic distribution system 100 before planning the primary route. In an embodiment, the known orders can further include 'new orders', forecasted orders, and 'orders being returned (i.e. orders which are to be picked up from customer locations)'. The primary route is designed in such a way that all known and forecasted orders that have been assigned to the vehicle can be delivered/served with least effort, within time specified for each order. The dynamic route planning system 103 receives (304) input pertaining to at least one route alteration parameter after planning the primary route (and when the vehicle may be already in transit along the primary route). In response to the received at least one route alteration parameter, the dynamic route planning system 103 determines (306) one of an alternate route or a corrective action. The alternate route is decided when the vehicle is to be re-routed to serve a dynamic order, or to perform pallet swapping with another vehicle, or when a congestion is detected in the primary route and so on. The term 'corrective action' action can refer to certain actions being triggered and/or executed by the dynamic distribution system 100 under specific circumstances that may impact order delivery. For example, assume that a vehicle that is in transit breaks down. In that case sending an alternate vehicle (a backup vehicle) to collect load from the other vehicle and to deliver the orders is a corrective action.

If an alternate route is determined in response to the alteration parameter, then the dynamic distribution system 100 generates (310) at least one instruction to re-route the vehicle along the determined alternate route. If a corrective action is determined in response to the alteration parameter, then the dynamic distribution system 100 triggers (312) the determined corrective action. In various embodiments, the various actions in method 300 can be performed in the same order as depicted, or in an alternate order, as per requirements. In another embodiment, one or more of the steps in method 300 may be omitted.

FIG. 4 is a flow diagram that depicts steps involved in the process of selecting one of an alternate route or a corrective action as part of the dynamic route planning, by the dynamic distribution system of FIG. 1, according to some embodiments of the present disclosure.

The order distribution system 101 collects details pertaining to all stores across a geographical location to be served, and then clusters/groups (402) all the stores into multiple sub classes called zones such that servicing of dynamic orders is optimized in terms of cost and time of servicing delivery. Parameters used for partitioning are but not limited to volume of mobile order received, number and type of vehicles servicing that group, distance between stores, location of stores, and traffic conditions. The order distribution system 101 then considers possible combinations of grouping and a score is calculated for each combination. The combination with minimum score is then selected for grouping stores in zones. Score is defined as cost of servicing a new mobile order based on parameters such as but not limited to extra unplanned vehicles needed, extra time impact on defined orders delivery and impact on life of any items services by stores.

Now in order to forecast the demand at zone level, the order distribution system 101 collects (404) history data pertaining to volume of mobile product orders from each store at zone level. The order distribution system 101 then extracts (406) certain parameters out of the collected history data as impact parameters, and assigns (408) weightage to each of the impact parameters. A few examples of the impact parameters is given below:

Variability of order volume by day of week, and week of month.

Time of year and factors such as festivals, events

Impact of seasons on the product consumption

Based on the weightages assigned, the order distribution system 101 then forecasts (410) demand and order for an item, at a particular zone, at a particular time period. In various embodiments, the various actions in method 400 can be performed in the same order as depicted, or in an alternate order, as per requirements. In another embodiment, one or more of the steps in method 400 may be omitted.

Figure 5:
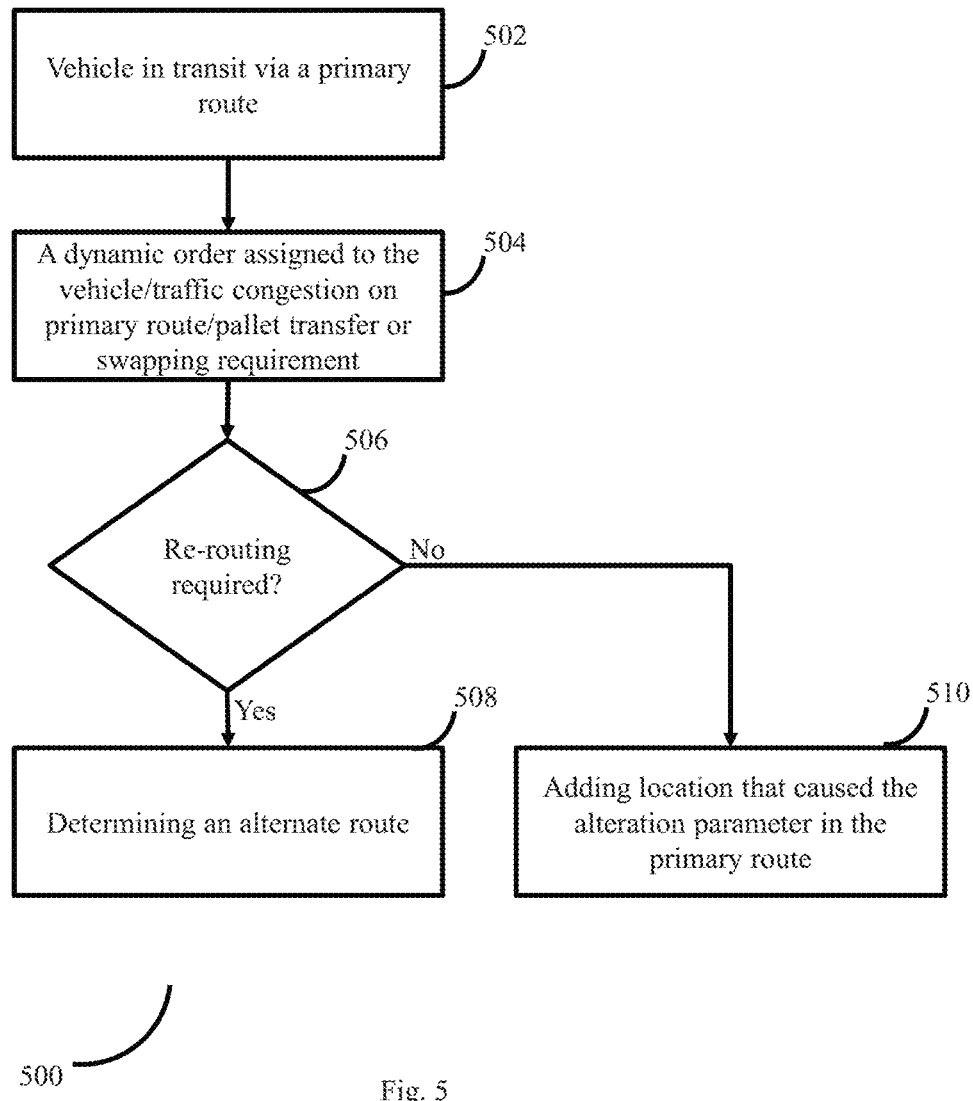
FIG. 5 is a flow diagram that depicts steps involved in the process of determining the alternate route, by the dynamic distribution system of FIG. 1, according to some embodiments of the present disclosure.

FIG. 5 is a flow diagram that depicts steps involved in the process of determining the alternate route, by the dynamic distribution system of FIG. 1, according to some embodiments of the present disclosure. When the vehicle is in transit (502) along the primary route, the dynamic route planning system 103 receives an alteration parameter such as but not limited to dynamic order assigned to the vehicle, traffic congestion on primary route, pallet transfer or swapping requirement, and so on which may or may not require change of route. The dynamic route planning system 103 checks (506) whether re-routing is required in response to the received alteration parameter. For example, if the alteration parameter received indicates that there is a traffic congestion along the primary route, or else another vehicle in a nearby location has a pallet transfer/swapping requirement, or else another order (a dynamic order) is to be delivered in addition to pre-determined and assigned orders, then an alternate route is determined (508). Else if the route is not to be changed, then the vehicle continues along the primary route and performs the order delivery. In various embodiments, the various actions in method 500 can be performed in the same order as depicted, or in an alternate order, as per requirements. In another embodiment, one or more of the steps in method 500 may be omitted.

Figure 6:
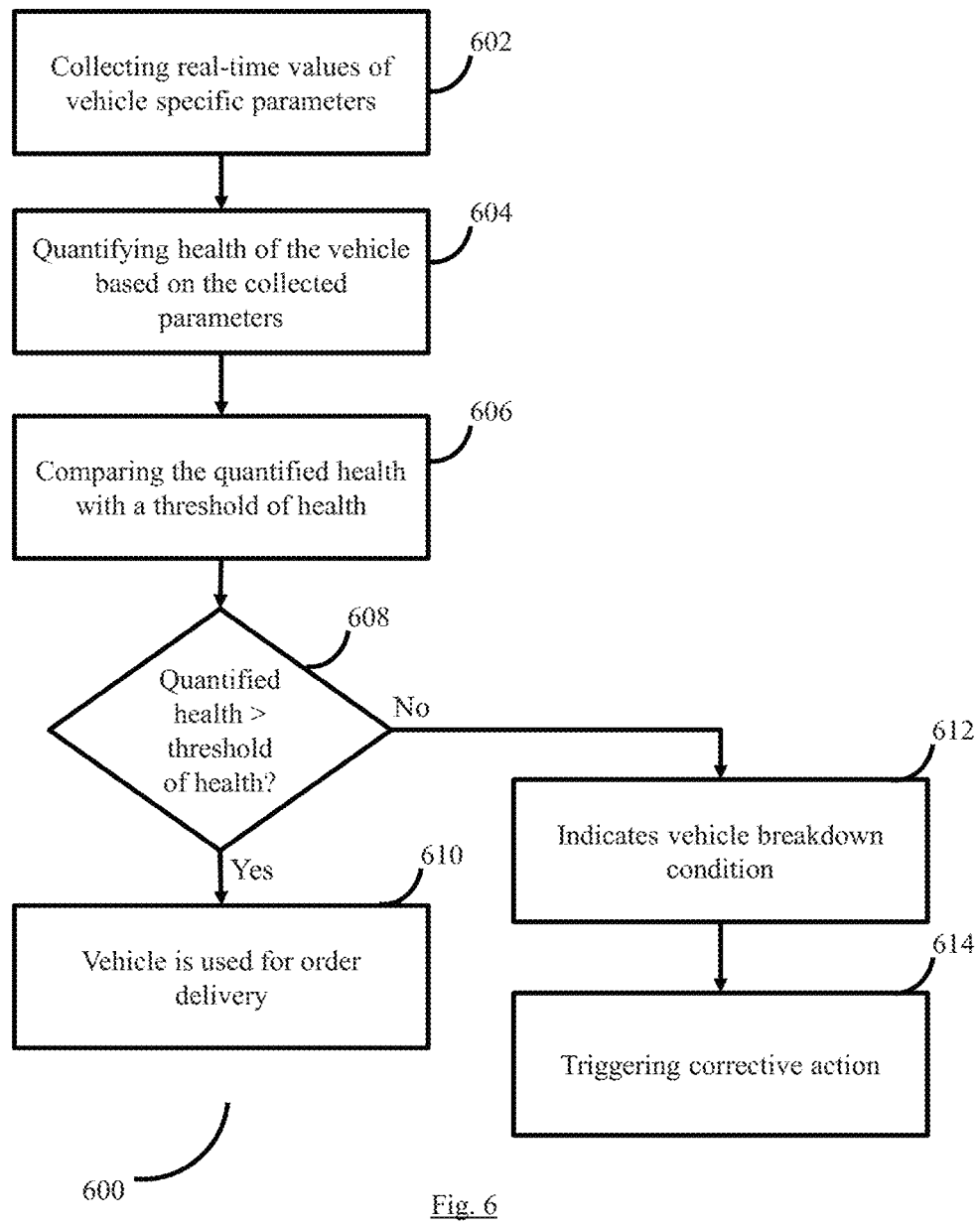
FIG. 6 is a flow diagram that depicts steps involved in the process of identifying a vehicle breakdown condition and triggering a corrective action, by the dynamic distribution system of FIG. 1, according to some embodiments of the present disclosure.

FIG. 6 is a flow diagram that depicts steps involved in the process of identifying a vehicle breakdown condition and triggering a corrective action, by the dynamic distribution system of FIG. 1, according to some embodiments of the present disclosure. Each vehicle is monitored using appropriate sensors of the vehicle mounted unit 105 and data pertaining to various vehicle specific parameters such as but not limited to velocity, engine temperature, vibrations, acceleration, and tyre pressure are collected (602). The collected data is then processed by the real time vehicle tracking module 102. While processing the collected data, the real time vehicle tracking module 102 quantifies (604) health of the vehicle based on the collected data, and then compares (606) it with a threshold of health (which is again defined in terms of benchmark values for all the parameters being collected). The quantified health of the vehicle being less than the threshold of health indicates (612) a vehicle breakdown scenario. In that case, if the vehicle is already in transit, the dynamic distribution system 100 can trigger (614) a corrective action by sending an alternate vehicle for order delivery, and the dynamic route planning system 103 can perform dynamic route planning for both the vehicles to intersect at a point and transfer pallets to the alternate vehicle. If the vehicle is not in transit, then that particular vehicle may not be considered while assigning orders for delivery as chances of breakdown is more. If the quantified health of the vehicle exceeds the health of the vehicle, then that negates possibility of vehicle breakdown, and the vehicle is used (610) for order delivery. In various embodiments, the various actions in method 600 can be performed in the same order as depicted, or in an alternate order, as per requirements. In another embodiment, one or more of the steps in method 600 may be omitted.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for fleet management for order delivery, comprising:
    assigning (302) a primary route to a vehicle from a fleet of vehicles, via one or more hardware processors, based on at least one of a known order and a forecasted order, wherein the forecasted order is generated by:
        clustering (402) a plurality of stores in each location into a plurality of zones based on a plurality of parameters including volume of mobile orders received, number and type of vehicles servicing each zone, distance between stores, location of stores, and traffic conditions, wherein for clustering the plurality of stores in each location into the plurality of zones, all possible combinations of the plurality of parameters are considered and a score is calculated for each combination in terms of cost of servicing a new mobile order based on extra unplanned vehicles needed, extra time impact on deliveries of known orders and impact on life of any items serviced by stores, and wherein a combination with minimum score is selected for clustering the plurality of stores into the plurality of zones; and
        collecting (404) and processing history data pertaining to sales from each store from each of the plurality of zones, comprising:
            extracting (406) a plurality of features pertaining to each sale recorded, as impact parameters;
            assigning (408) weightage to each of the plurality of impact parameters; and
            forecasting (410) demand for an item in a particular zone, at a particular time, based on the weightage of at least one of the plurality of impact parameters;
    collecting (602) real-time value of at least one of a plurality of vehicle specific parameters;
    quantifying (604) health of the vehicle based on the collected real-time value of the at least one of the plurality of vehicle specific parameters;
    comparing (606) the quantified health of the vehicle with a threshold of vehicle health, to identify condition of the vehicle;
    receiving (304) an input with respect to at least one of a route alteration parameter when the vehicle is in transit in the primary route, via the one or more hardware processors, wherein the route alteration parameter is at least one of a traffic condition along the primary route, a dynamic order assigned to the vehicle, an order cancellation, an order return, the identified condition of the vehicle, driver behavior, and at least one parameter demanding pallet swapping with at least one other vehicle from the fleet of vehicles;
    determining (306) one of an alternate route or a corrective action, in response to the at least one route alteration parameter, via the one or more hardware processors; and
    performing one of:
        generating (310) at least one instruction to re-route the vehicle along the determined alternate route, if in response to the at least one route alteration parameter the alternate route is determined, via the one or more hardware processors; and
        triggering (312) the corrective action, if in response to the at least one route alteration parameter the corrective action is determined, via the one or more hardware processors, wherein the corrective action is triggered in response to the identified condition of the vehicle by:
            identifying (612) the health of the vehicle as indicative of a vehicle breakdown condition if the quantified health is below the threshold of vehicle health; and
            assigning (614) an alternate vehicle for order delivery upon identifying the vehicle breakdown condition.

2. The method as claimed in claim 1, wherein the alternate route is determined for the vehicle based on the dynamic order by:

identifying location and a specified time of delivery of the dynamically assigned order; and modifying the primary route to cover the location of the dynamically assigned order, to deliver the order as per the specified time of delivery.

3. A system (100) comprising:

a processing module (104) comprising one or more hardware processors; and a memory module (102) operatively coupled to the one or more hardware processors and configured to store instructions configured for execution by the one or more hardware processors to:

assign a primary route to a vehicle from a fleet of vehicles, by a dynamic route planning system (103) of the system (100), based on at least one of a known order and a forecasted order assigned to the vehicle by an order distribution system (101), wherein the order distribution system (101) is configured to generate the forecasted order by:

clustering a plurality of stores in each location into a plurality of zones based on a plurality of parameters including volume of mobile orders received, number and type of vehicles servicing each zone, distance between stores, location of stores, and traffic conditions, wherein for clustering the plurality of stores in each location into the plurality of zones, all possible combinations of the plurality of parameters are considered and a score is calculated for each combination in terms of cost of servicing a new mobile order based on extra unplanned vehicles needed, extra time impact on deliveries of known orders and impact on life of any items serviced by stores, and wherein a combination with minimum score is selected for clustering the plurality of stores into the plurality of zones; and processing history data pertaining to sales from each store from each of the plurality of zones, comprising:

extracting a plurality of features pertaining to each sale recorded, as impact parameters;

assigning weightage to each of the plurality of impact parameters; and forecasting demand for an item in a particular zone, at a particular time, based on the weightage of at least one of the plurality of impact parameters;

collecting real-time value of at least one of a plurality of vehicle specific parameters;

quantifying health of the vehicle based on the collected real-time value of the at least one of the plurality of vehicle specific parameters;

comparing the quantified health of the vehicle with a threshold of vehicle health, to identify condition of the vehicle;

receive an input with respect to at least one of a route alteration parameter when the vehicle is in transit in the primary route, by the dynamic route planning system (103), wherein the route alteration parameter is at least one of a traffic condition along the primary route, a dynamic order assigned to the vehicle, an order cancellation, an order return, the identified condition of the vehicle, driver behavior, and at least one parameter demanding pallet swapping with at least one other vehicle from the fleet of vehicles;

determine one of an alternate route or a corrective action, in response to the at least one route alteration parameter, by the dynamic route planning system (103); and perform one of:

generating at least one instruction to re-route the vehicle along the determined alternate route, if in response to the at least one route alteration parameter the alternate route is determined, by the dynamic route planning system (103); and triggering the corrective action, if in response to the at least one route alteration parameter the corrective action is determined, by the dynamic route planning system (103), wherein the dynamic route planning system (103) is configured to determine the corrective action in response to the identified condition of the vehicle by:

identifying the health of the vehicle as indicative of a vehicle breakdown condition if the quantified health is below the threshold of vehicle health; and assigning an alternate vehicle for order delivery upon identifying the vehicle breakdown condition.

4. The system (100) as claimed in claim 3, wherein the dynamic route planning system (103) is configured to determine an alternate route for the vehicle based on the dynamic order by:

identifying location and a specified time of delivery of the dynamically assigned order; and modifying the primary route to cover the location of the dynamically assigned order, to deliver the order as per the specified time of delivery.

5. One or more non-transitory machine readable information storage mediums comprising one or more instructions which when executed by one or more hardware processors causes:

assigning (302) a primary route to a vehicle from a fleet of vehicles, via one or more hardware processors, based on at least one of a known order and a forecasted order, wherein the forecasted order is generated by:

clustering (402) a plurality of stores in each location into a plurality of zones based on a plurality of parameters including volume of mobile orders received, number and type of vehicles servicing each zone, distance between stores, location of stores, and traffic conditions, wherein for clustering the plurality of stores in each location into the plurality of zones, all possible combinations of the plurality of parameters are considered and a score is calculated for each combination in terms of cost of servicing a new mobile order based on extra unplanned vehicles needed, extra time impact on deliveries of known orders and impact on life of any items serviced by stores, and wherein a combination with minimum score is selected for clustering the plurality of stores into the plurality of zones; and collecting (404) and processing history data pertaining to sales from each store from each of the plurality of zones, comprising:

extracting (406) a plurality of features pertaining to each sale recorded, as impact parameters;

assigning (408) weightage to each of the plurality of impact parameters; and forecasting (410) demand for an item in a particular zone, at a particular time, based on the weightage of at least one of the plurality of impact parameters;

collecting (602) real-time value of at least one of a plurality of vehicle specific parameters;

quantifying (604) health of the vehicle based on the collected real-time value of the at least one of the plurality of vehicle specific parameters;

comparing (606) the quantified health of the vehicle with a threshold of vehicle health, to identify condition of the vehicle;

receiving (304) an input with respect to at least one of a route alteration parameter when the vehicle is in transit in the primary route, via the one or more hardware processors, wherein the route alteration parameter is at least one of a traffic condition along the primary route, a dynamic order assigned to the vehicle, an order cancellation, an order return, the identified condition of the vehicle, driver behavior, and at least one parameter demanding pallet swapping with at least one other vehicle from the fleet of vehicles;

determining (306) one of an alternate route or a corrective action, in response to the at least one route alteration parameter, via the one or more hardware processors; and performing one of:

generating (310) at least one instruction to re-route the vehicle along the determined alternate route, if in response to the at least one route alteration parameter the alternate route is determined, via the one or more hardware processors; and triggering (312) the corrective action, if in response to the at least one route alteration parameter the corrective action is determined, via the one or more hardware processors, wherein the corrective action is triggered in response to the identified condition of the vehicle by:

identifying (612) the health of the vehicle as indicative of a vehicle breakdown condition if the quantified health is below the threshold of vehicle health; and assigning (614) an alternate vehicle for order delivery upon identifying the vehicle breakdown condition.

6. The one or more non-transitory machine readable information storage mediums of claim 5, wherein the one or more instructions which when executed by the one or more hardware processors, for determining the alternate route for the vehicle based on the dynamic order cause:

identifying location and a specified time of delivery of the dynamically assigned order; and modifying the primary route to cover the location of the dynamically assigned order, to deliver the order as per the specified time of delivery.

* * * * *